(12) United States Patent
Ajmeri et al.

(10) Patent No.: US 10,694,322 B2
(45) Date of Patent: *Jun. 23, 2020

(54) DYNAMIC MIX ZONES

(71) Applicant: HERE Global B.V., Eindhoven (NL)

(72) Inventors: Nirav Ajmeri, Raleigh, NC (US); Raghavendran Balu, Eindhoven (NL); Bo Xu, Lisle, IL (US); Matei Stroila, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,706

(22) Filed: Jun. 27, 2019

(65) Prior Publication Data

US 2019/0373403 A1   Dec. 5, 2019

Related U.S. Application Data

(63) Continuation of application No. 15/965,527, filed on Apr. 27, 2018, now Pat. No. 10,382,889.

(51) Int. Cl.
*H04W 4/021* (2018.01)
*H04W 12/02* (2009.01)
*H04W 4/40* (2018.01)

(52) U.S. Cl.
CPC .......... *H04W 4/021* (2013.01); *H04W 4/022* (2013.01); *H04W 4/40* (2018.02); *H04W 12/02* (2013.01)

(58) Field of Classification Search
CPC ....... H04W 4/021; H04W 4/40; H04W 4/022; H04W 12/02

USPC ...................................................... 455/456.1
See application file for complete search history.

(56) References Cited

U.S. PATENT DOCUMENTS

| 8,655,389 | B1* | 2/2014 | Jackson | ................. H04L 67/18 455/457 |
| 9,547,845 | B2 | 1/2017 | Agrawal et al. | |
| 2015/0134850 | A1* | 5/2015 | Rolf | ..................... H04L 45/126 709/241 |
| 2015/0350891 | A1* | 12/2015 | Arunkumar | ............ H04W 8/16 455/456.2 |

(Continued)

OTHER PUBLICATIONS

Beresford, Alastair R., et al. "Location Privacy in Pervasive Computing." IEEE Pervasive Computing 1. 2003. (pp. 46-55).

(Continued)

*Primary Examiner* — Julio R Perez
(74) *Attorney, Agent, or Firm* — Lempia Summerfield Katz LLC

(57) ABSTRACT

An apparatus for providing anonymity in geographic data for probes using a variable mix zone in a geographic region includes a geographic database, a mix zone generator, and a pseudonym generator. The geographic database is configured to store one or more map features in the geographic region. The mix zone generator is configured to define a mix zone boundary having a size based on the one or more map features and monitor probe data for at least one probe. The probe data including a location within a predetermined distance of the mix zone boundary. The pseudonym generator is configured to select a pseudonym for the at least one probe in response to the location of the probe data and apply the pseudonym for the at least one probe in the geographic data when the at least one probe exits the mix zone.

14 Claims, 15 Drawing Sheets

(56) References Cited

U.S. PATENT DOCUMENTS

2017/0277716 A1* 9/2017 Giurgiu .............. G06F 16/2365

OTHER PUBLICATIONS

He, Xiofan, et al. "Exploiting Temporal Diversity for Privacy-Aware Location Based Services in Mobile Networks." IEEE. (pp. 1-10).
Liu, Xinxin, et al. "Traffic-Aware Multiple Mix Zone Placement for Protecting Location Privacy." 2012 Proceedings IEEE INFOCOM. IEEE. 2012. (pp. 972-980).
Lu, Rongxing, et al. "Pseudonym Changing at Social Spots: An Effective Strategy for Location Privacy in Vanets." IEEE Transactions on Vehicular Technology 20.20. Jul. 2011. (pp. 1-11).
Naher, Nazmun. "Real-Time Sharing of Privacy Protected Location Data in Road Networks." Thesis. Department of Computer Science and Engineering (CSE). Bangladesh University of Engineering and Technology (BUET). Dhaka 1000. Feb. 2016. (pp. 1-66).
Palanisamy, Balaji, et al. "Attack-Resilient Mix-Zones Over Road Networks: Architecture and Algorithms." IEEE Transactions on Mobile Computing 14.3. May 14, 2014. (pp. 1-18).
Xu, Ge Toby. "Exploring Historical Location Data for Anonymity Preservation in Location-Based Services." Retrospective Theses and Dissertations, 14878. 2007. (pp. 1-43).
Ying, Bidi, et al. "Dynamic Mix-Zone for Location Privacy in Vehicular Networks." IEEE Communications Letters 17.8. Aug. 2013. (pp. 1524-1527).
You, Tun Hao, et al. "Protecting Moving Trajectories with Dummies." 2007 International Conference on Mobile Data Management. IEEE. May 2007. (pp. 1-5).

* cited by examiner

DYNAMIC MIX ZONES

CROSS-REFERENCE TO OTHER APPLICATIONS

This application is a continuation under 35 U.S.C. § 120 and 37 C.F.R. § 1.53(b) of U.S. patent application Ser. No. 15/965,527 filed Apr. 27, 2018, which is hereby incorporated by reference in its entirety.

FIELD

The following disclosure relates to the mitigation of privacy concerns surrounding probe data for location-based services.

BACKGROUND

The Global Positioning System (GPS) or another global navigation satellite system (GNSS) provides location information to a receiving device anywhere on Earth as long as the device has a substantial line of sight without significant obstruction to three or four satellites of the system. Location-based services control features of an application based on location information from a GNSS or another source.

Example location-based services may be embedded in a mapping application, navigation application, social media application, games, and other applications. A map developer may provide the location information to the location-based services. The application itself may have access to the data. With many applications having access to the location information, the privacy of the location information of the users may be at risk.

SUMMARY

In one embodiment, a method for providing anonymity in geographic data for probes using a variable mix zone in a geographic region includes identifying one or more map features in the geographic region, defining, using a processor, a mix zone boundary having a size based on the one or more map features, receiving probe data for at least one probe, the probe data including a location within a predetermined distance of the mix zone boundary, selecting, using the processor, a pseudonym for the at least one probe in response to the location of the probe data, and applying the pseudonym for the at least one probe in the geographic data when the at least one probe exits the mix zone.

In one embodiment, an apparatus for providing anonymity in geographic data for probes using a variable mix zone in a geographic region includes a geographic database, a mix zone generator, and a pseudonym generator. The geographic database is configured to store one or more map features in the geographic region. The mix zone generator is configured to define a mix zone boundary having a size based on the one or more map features and monitor probe data for at least one probe, the probe data including a location within a predetermined distance of the mix zone boundary. The pseudonym generator is configured to select a pseudonym for the at least one probe in response to the location of the probe data and apply the pseudonym for the at least one probe in the geographic data when the at least one probe exits the mix zone.

In one embodiment, a non-transitory computer readable medium including instructions that when executed by a process perform a method including generating first location data for a first location of a probe, wherein one or more map features are identified in response to the first location data, sending the location data to a mix zone generator for defining a mix zone having a size based on the one or more map features, wherein the first location is within the mix zone, generating second location data for a second location of the probe, and receiving a pseudonym in response to the second location of the probe being outside the mix zone.

BRIEF DESCRIPTION OF THE DRAWINGS

Exemplary embodiments of the present invention are described herein with reference to the following drawings.

DETAILED DESCRIPTION

Figure 1:
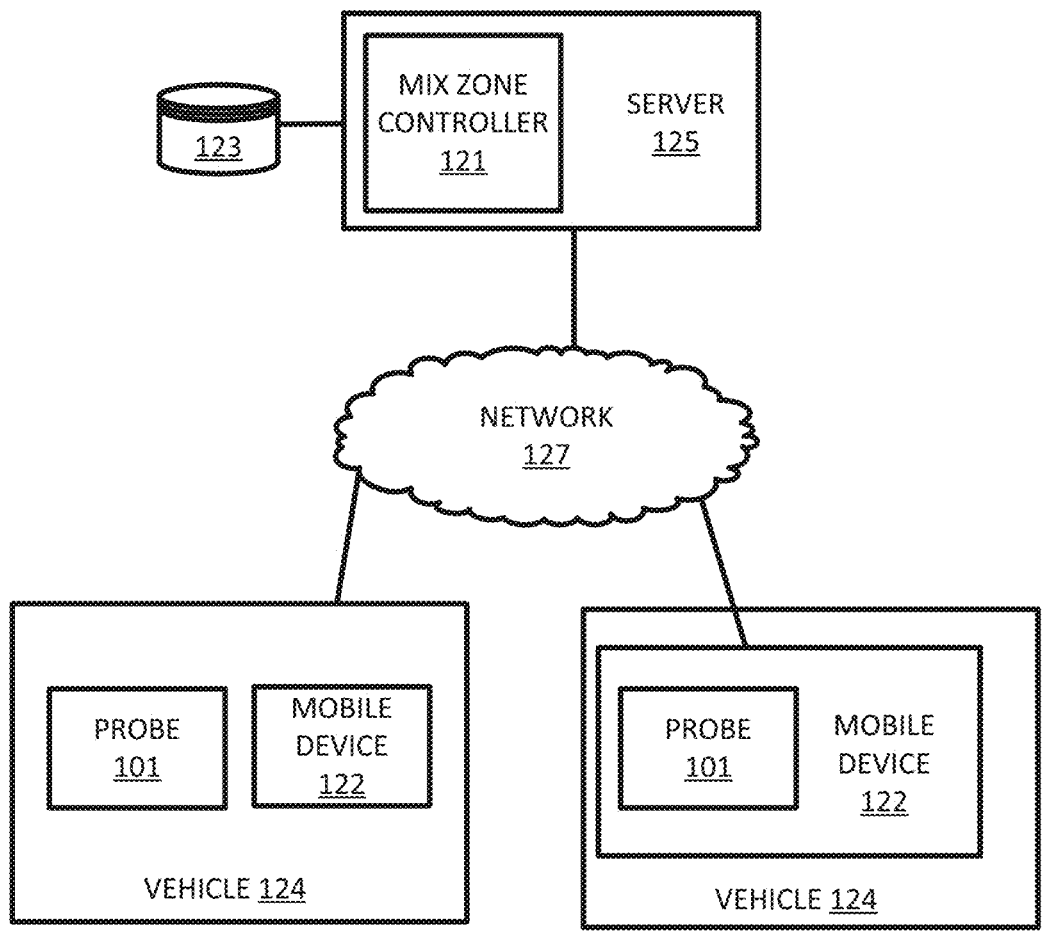
FIG. 1 illustrates an example system for controlling dynamic mix zones for probe data.

Location information is detected and stored by a variety of devices. Primarily, mobile devices such as vehicles, mobile phones or smart phones are continuously (at frequent intervals) determining their current positions and reporting the location information. The location information may be logged by many different entities. Social media applications may track users for the purpose of identifying contacts or places to visit and may provide content in response to location. Mapping and navigation application provide turn-by-turn directions or maps based on the location information. Crowd sourcing applications provide reviews on products or points of interest (POIs) according to location information.

In some examples, an intermediary such as a map developer maintains the database of location information. The map develop may provide an open location platform that the other application may access to obtain location information. The security or privacy of the location information depends on the security policies of each of the applications. A data breach by any of these applications may result in the identity and habits of the users being compromised.

To protect privacy the location information may be stored anonymously using anonymous probe identities. That is, the identity of the user may be anonymous with respect to the log of location information. However, unauthorized users of the data may still analyze the location points generated from the same probe identifiers, the source and destination of a trip as well as the traveled path could be recovered. A repeatedly observed trip from a residential place to a business place may suggest the home location and office location; frequent visits to a hospital may suggest health issues. The following embodiments improve privacy during the detection, storage, and servicing of probe data through the use of dynamic mix zones that selectively block the identities of devices in response to traveling in the mix zones. By dynamically reducing and enlarging the mix zone size, the system preserves privacy and provides optimal utility based on a predetermined anonymity level.

The following embodiments relate to several technological fields including but not limited to navigation, autonomous driving, assisted driving, traffic applications, and other location-based systems. The following embodiments achieve advantages in each of these technologies because the extent of the geographic area that accurate data can be provided to applications or third parties while maintaining the requisite security and private is improved. In each of the technologies of navigation, autonomous driving, assisted driving, traffic applications, and other location-based systems, the number of users that can be adequately served is increased. In addition, users of navigation, autonomous driving, assisted driving, traffic applications, and other location-based systems are more willing to adopt these systems given the technological advances in the data security.

FIG. 1 illustrates an example system for controlling dynamic mix zones for probe data. A variable or dynamic mix zone (i.e., a mix zone that changes shape) increases anonymity of the users. Anonymity of the users means that the privacy is protected from unauthorized users revealing the identity and actions of the users and protected from analysis of user habits (e.g., frequently visited places) revealing the identity and actions of the users. The following embodiments prevent a tracking threat. An attacker (e.g., an entity with unauthorized access of the probe data, or an authorized user performing an unauthorized action with the probe data) with knowledge of a snapshot of a probe trajectory is only able to track any probe up to a nearest mix zone, and not determine the complete trajectory.

In FIG. 1, one or more vehicles 124 are connected to the server 125 though the network 127. The vehicles 124 may be directly connected to the server 125 or through an associated mobile device 122. A map developer system, including the server 125 and a geographic database 123, exchanges (e.g., receives and sends) data from the vehicles 124. The mobile devices 122 may include local databases corresponding to a local map, which may be modified according to the server 125. The local map may include a subset of the geographic database 123 and are updated or changed as the vehicles 124 travel. The mobile devices 124 may be standalone devices such as smartphones or devices integrated with vehicles. Additional, different, or fewer components may be included.

Each vehicle 124 and/or mobile device 122 may include position circuitry such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The mobile device 122 may use the probe data for local applications. For example, a map application may provide a map to the user of the mobile device 122 based on the current location. A social media application may provide targeted content based on the current location. A game application may provide a setting or objects within the game in response to the current location.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 2:
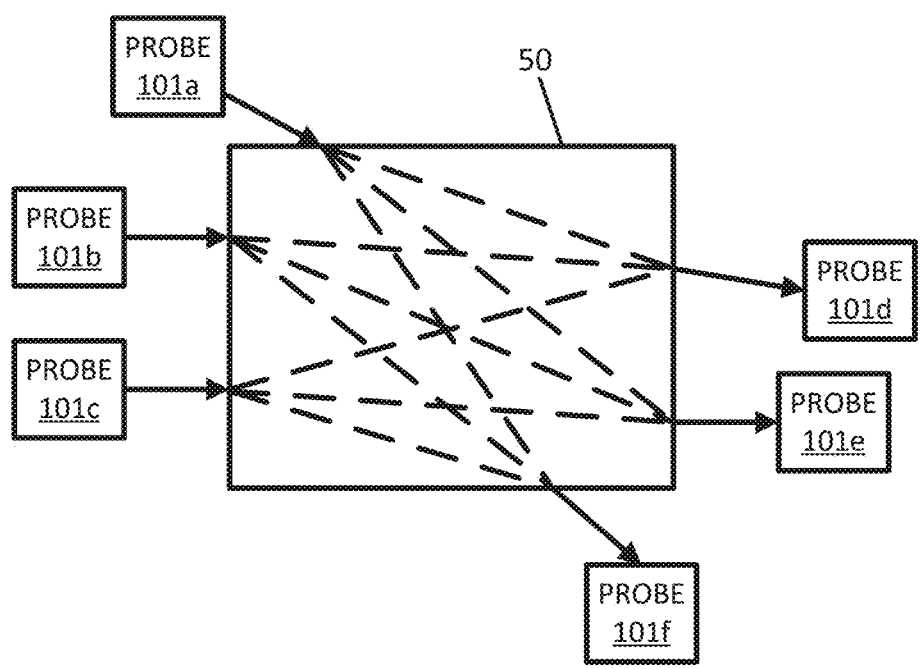
FIG. 2 illustrates an example mix zone.

FIG. 2 illustrates a mix zone 50 including three entry points and three exits points. The mix zone 50 is a geographic area applied to a map or a set of geographic data. The geographic area for the mix zone 50 may be defined by geographic boundaries that form a shape on the map. The mix zone may be circular, oval, rectangular, or another polygon shape (e.g., triangle, trapezoid, quadrilateral, etc.). The shape of the mix zone 50 may be defined by road segments in the geographic database 123.

Each entry point is connected to each exit point and vice versa. A mix zone may be defined as a geographic area that affects the identity associated with probe data. Each geographic location in the probe data may be associated with an identifier for the mobile device 122 or probe 101 that collected the data. The identifier may include or be derived from a part or the entirety of an IP address, a device id, a MAC address, a username, an email address, or any data that can uniquely identify, either globally or within a network, the mobile device 122 or the probe 101.

The mix zone 50 may be an area that changes location-based services for the mobile device 122. While in the mix zone 50, the mix zone controller 121 may remove the identifier from the probe data from the probe 101. With no identifier, no services based on the probe data are available to the associated mobile device 122 or vehicle 124. The mix zone 50 may cause mobile devices traveling in the mix zone 50 to disable location-based services. The mobile device 122 may report its current location to the server 125, which compares the current location to defined mix zones. The server 125 sends a command to the mobile device 122 to disable location-based services. Alternatively, the command may change the access that location-based services have to the probe data. The changed access may distort the resolution of the probe data. For example, the location coordinates in the probe data may be randomly changed by a small amount.

As a result, as mobile devices 122 (e.g., via vehicles 124, pedestrians, etc.) travel into the mix zone 50 the applications available at the mobile devices are reduced. Depending on the size of the mix zone 50, users of the mobile devices may be unaware that services have disabled because they are in the mix zone 50 for a short period of time.

As shown in the mix zone 50 of FIG. 2, probe 101a could have traveled through the mix zone 50 to the location of probe 101d, to the location of probe 101e, or to the location of probe 101f. The same is true from probes 101b and 101c. The mix zone controller 121 creates anonymity for the probes 101a-c while the mix zone 50 is traversed. The mix zone 50 mixes the identities of the probes so that the paths before the mix zone 50 for probes 101a-c cannot be reliably matched with the paths after the mix zone 50 of probes 101d-f. From the perspective of the intermediate user of the probe data (e.g., user of the open location platform), the probes 101a-c are indistinguishable from each other. The term indistinguishable means that analysis of the probe data cannot predict with a statistical significance whether one of probes 101a-c corresponds to 101d, 101e, or 101f.

The mix zone controller 121 may change the identifier associated with probe data when the probe 101 exits the mix zone boundary and/or is within the mix zone 50. The mix zone controller 121 may encrypt the identifier. The mix zone controller 121 may remove the identifier and apply a new identifier. For example, the new identifier may indicate the identity of mix zone 50 together with a count for probes 101 exiting the mix zone 50.

However, in some situations, threats may remain even if the identifiers are modified for probes traveling through the mix zone 50. An attacker or unauthorized user may analyze the probe data and estimate identities of users even if the probe data is not included for the probe data in the mix zone. For example, an identity of a probe may be inferred from a final destination that is associated with a user. The final destination may be home or office or another location that the user repeatedly and predictably visits. A user's home or office location may be known from another dataset (e.g., public profile). Similarly, probes may be profiled based on tastes, preferences, or past destinations. A user's religious affiliation or preferred cuisine may indicate identity. The unauthorized user may utilize that information to identify in the probe data of the mix zone even if pseudonyms have been used in the mix zone.

An unauthorized user may also use a statistical analysis to estimate the identity of user even when the identity has been masked by a mix zone. In one simple example, an intersection hash one entry road segment and two exit road segments. Historically, traffic a high majority (e.g., 99%) through the intersection take the same exit. A mix zone over this intersection may not effectively mask the identities of the probes because most of the probes exit the mix zone in the same direction and in a similar order as they went in the mix zone. If there is spacing between the probes, the probes may enter and exit in the same order. An unauthorized user may infer the identities of probes exiting the mix zone based on the identities of the probes entering the mix zone. The statistical analysis may include more complex predictions that occur during certain times or days (e.g., high incident of turning onto an on-ramp during rush hour).

The following embodiments prevent these identity breaches by prohibiting potential attackers by maintaining an anonymity level with a dynamic mix zone.

The server 125 is configured to analyze the location data to map match the location data to geographic data from the geographic database 123. In one example, the server 125 may match the location data directly with any applicable mix zones. In this example, the mix zones may be associated with geographic coordinates, defining areas that are easily matched with the location data. The mix zones may be stored in a table that lists vertices for the shapes of the mix zones.

In another example, the mix zones may be associated with road segments or nodes. The mix zones may be stored in a table that lists road segments or nodes included in the mix zone. In this example, the mix zones are defined according to road segment and/or nodes, and the server 125 matches the location data first to the road segment and then determines whether the road segment or a portion of the road segment is included in the mix zone.

For matching, the mix zone controller 121 may query the database 123 for the road network. The mix zone controller 121 may access a geographic region based on the location data as a rough estimate. The mix zone controller 121 may more precisely match the location data to a particular roadway or road segment by comparing the location data to the data from the database 123. Such map matching may include identifying the closest road segment to the location data. For example, the mix zone controller 121 may calculate a perpendicular distance to multiple road segments. The perpendicular distance to a road segment may be the length of a line that intersects the geographic point of the location data received from one or more vehicles 124 and connects to the road segment and meets the road segment at a right angle.

Figure 3:
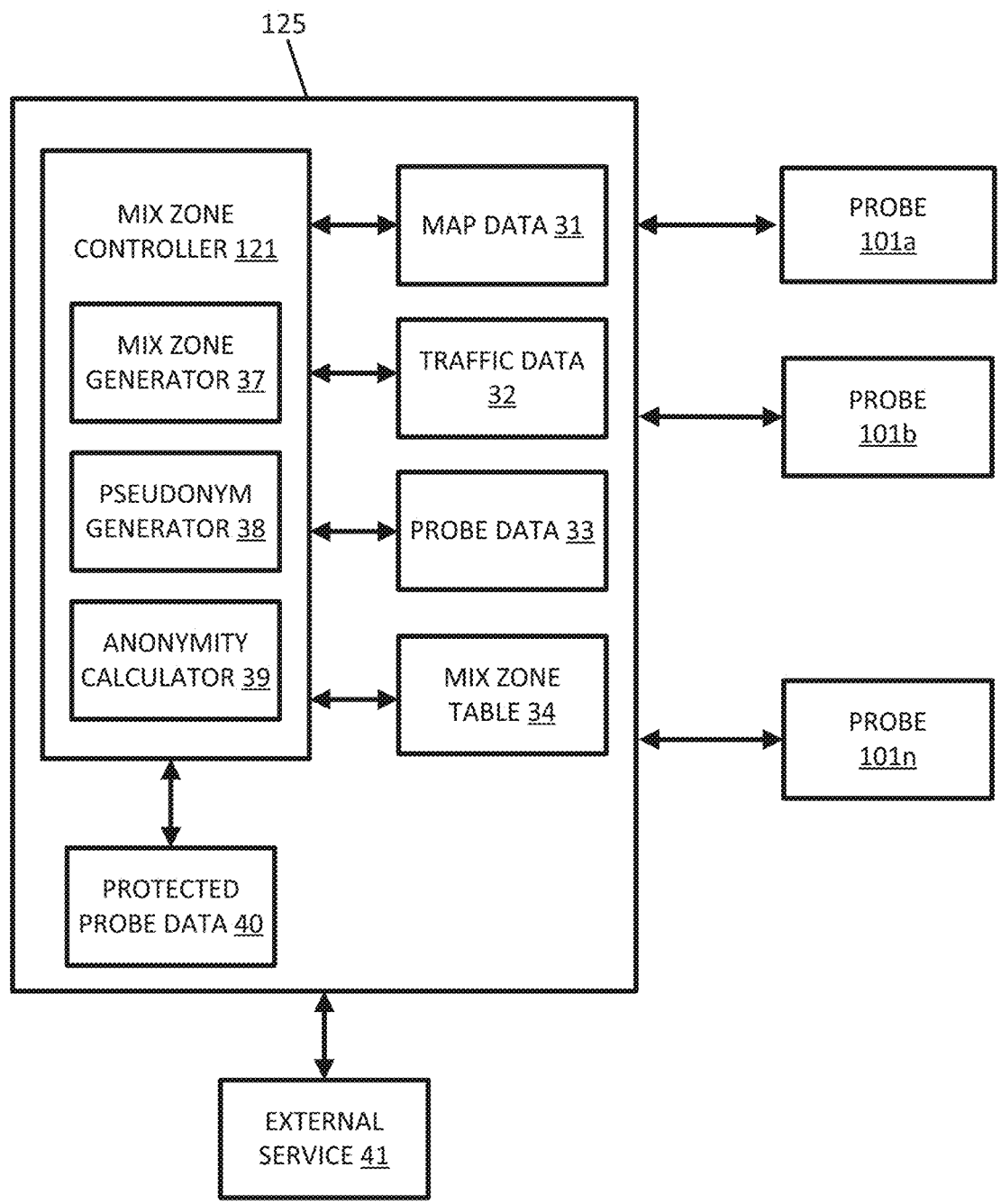
FIG. 3 illustrates an example central server for controlling dynamic mix zones.

FIG. 3 illustrates an example central server 125 for controlling dynamic mix zones. The server 125 includes the mix zone controller 121 connected to multiple mobile devices 101a-101n. The mix zone controller 121 includes a mix zone generator 37, an anonymity calculator 39, and a pseudonym generator 38. The mix zone controller 121 accesses data stored in memory or received from the mobile device 101. The data includes map data 31, traffic data 32, probe data 33, and mix zone tables 34. The mix zone controller 101 outputs the protected probe data 40. Addition, different, or fewer components may be included.

Figure 4A:
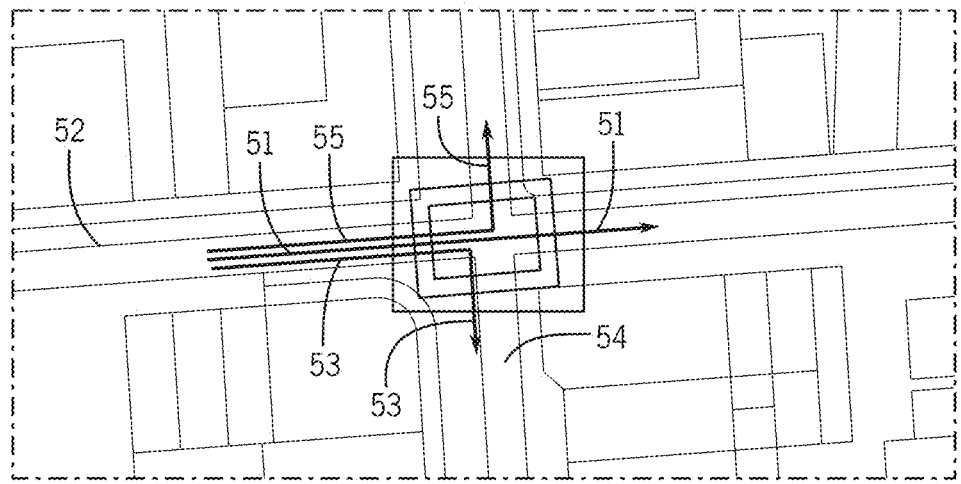
FIG. 4A illustrates an example intersection.

FIG. 4A illustrates an intersection including two road segments (e.g., east west road segment 52 and north south road segment 54). There are three probes or vehicles traveling on segment 52. Probe 51 maintains a straight trajectory through the intersection. Probe 53 turns right at the intersection and heads south on segment 54. Probe 55 turns left at the intersection and heads north on segment 54.

Figure 4B:
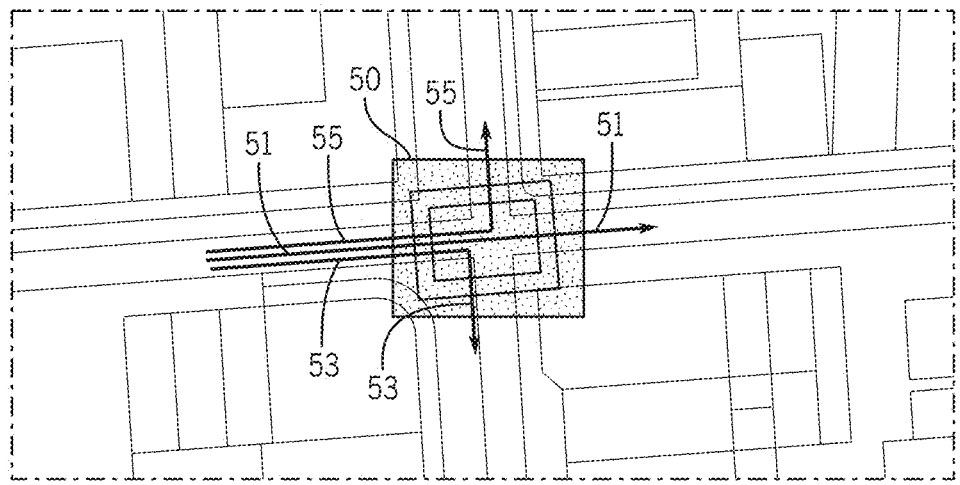
FIG. 4B Illustrate an example dynamic mix zone for the intersection of FIG. 4A.

FIG. 4B Illustrate an example dynamic mix zone for the intersection of FIG. 4A. The mix zone covers the intersection and the probes 51, 53, and 55 as they traverse the intersection and the adjacent road segments.

The map data 31 include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data 31. The map data 31 may include structured cartographic data or pedestrian routes.

The mix zone controller 121 may adjust the size of the mix zone 50 based on one or more map features. Alternatively, the default size of the mix zone 50 may be determined based on one or more map features. In either case, the mix zone controller 121 access the map data 31 and identifies one or more map features in the geographic region.

The map data 31 may include map features that describe the attributes of the roads and intersections. The map features may include geometric features, restrictions for traveling the roads or intersections, roadway features, or other characteristics of the map that affects how vehicles 124 or mobile device 122 flor through a geographic area.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

When defining the mix zone 50, the mix zone controller 121 may start with a default size for the mix zone 50. The default size for the mix zone 50 may be defined by the mix zone table 34. The default size may be the area around a node and intersection. The mix zone table 34 may list groups of nodes and/or intersection to define mix zones. The default size may be one node and the extent of each road segment that connects to the node. The mix zone table 34 may list groups of road segments of mix zones. The defaults size may be a predetermined number (e.g., 2, 3, 4, or more) nodes and the corresponding road segments that are connected to one or more of the nodes. The starting intersection or group of intersections may be selected based on a predetermined or default position, a user selection, or a random selection.

The mix zone controller 121, by way of the mix zone generator 37, defines a mix zone boundary having a size based on the one or more map features. The size of the mix zone 50 may be increased to include a projected number of mobile device 122 or vehicles 124. The size of the mix zone 50 may be made smaller when speed limits are lower and greater when speed limits are greater because when the vehicles travel more quickly through the mix zone, there are fewer vehicles in the mix zone at any given time. The size of the mix zone 50 may depend on functional classification for similar reasons. The size of the mix zone 50 may be made larger when there are more turn restrictions.

The mix zone controller 121 may monitor the probes 101*a*-*n* using probe data 33. The mix zone controller 121 identifies locations from the probe data 33 to determine when a probe crosses the mix zone boundary. The mix zone controller 121 may first identify probes that are within a predetermined distance from the mix zone boundary and monitor those probes at a smaller interval. For example, the mix zone controller 121 may compare the locations of all probes to the mix zone boundary at a large time interval (e.g., every 10 minutes) and then for probes within a mile of the mix zone boundary, compare the locations of the probes at a small time interval (e.g., every 1 second).

The mix zone controller 121 determines when probes are located within the mix zone 50 or pass the mix zone boundary to exit the mix zone 50. When probes are located within the mix zone 50 or pass the mix zone boundary to exit the mix zone 50, the pseudonym generator 38 generates a pseudonym for the probe. The pseudonym generator 38 is configured to select a pseudonym for the probe 101 in response to the location of the probe data. The pseudonym is an identifier that was not previously associated with the probe. The pseudonym may be a number or an alphanumeric code. The pseudonym generator 38 may assign numeric codes from 1 or another value that increment according to a clock or sequentially. The pseudonym is not the identifier that is associated with the probe prior to entering the mix zone 50. The mix zone controller 121 applies the pseudonym for the at least one probe in the geographic data when the at least one probe exits the mix zone.

The mix zone controller 121 outputs the protected probe data 40, which is the probe data with one or more pseudonyms applied to the probe data. The protected probe data 40 may be send to an external service or device 41 configured to provide one or more application with location-based services with the protected probe data 40.

The mix zone controller 121 may adjust the shape and/or size of the mix zone 50 based on anonymity. For example, the mix zone controller 121 may adjust the mix zone boundaries based on anonymity. The anonymity calculator 39 may calculate an anonymity level, and the mix zone controller 121 compares the anonymity level to a threshold level and adjusts the mix zone boundary and/or the size of the mix zone 50 in response to the comparison.

The mix zone controller 121 is configured to dynamically adjust the shape and size of the mix zone 50 based on the average anonymity of probes passing through the mix zone 50. The anonymity calculator 39 may calculate the average anonymity based on the number of probes in the mix zone 50. If the average anonymity falls below a minimum k, the mix zone controller 121 enlarges the mix zone 50 to include more nodes and/or road segments connected to the exiting zone. If the average anonymity is larger than k, the mix zone controller 121 shrinks the size of the mix zone 50 to include fewer nodes and/or road segments. The threshold may include a minimum threshold and a maximum threshold such that when the anonymity level is less than the minimum threshold, the size of the mix zone is increased, and when the anonymity level is greater than the maximum threshold, the size of the mix zone is decreased.

The anonymity level may be a K-anonymity. The K-anonymity ensures that in a set of k probes, the target object is indistinguishable from the other k−1 probes. The probability to identify the target probe is 1/k. The anonymity calculator 39 may calculate the anonymity level. The anonymity calculator 39 may calculate the anonymity level based on the number of exits from the mix zone 50 (e.g., the number of road segments with a direction leading out of the mix zone 50) and/or the number of probes currently traveling in the mix zone 50. For a probe p entering a mixed zone M at a time $t\_0$, the mix zone controller 121 may compute the expected times, $T\_i$ (i: ranging from 1 to the number of possible exits), of exiting the mix zone M at a certain exit point $P\_i$, and the standard deviation of this exit time, $StDev\_i$. The expected times and standard deviation may be computed from real time data or previously logged data. The previously logged data may include historical data and/or simulations. It may be dependent on local map geometry and map attributes (speed limits, lane counts, etc.) and on whether synthetic probes are used or not.

For k-level anonymity, there may be at least k−1 probes exiting all probable points at a time within a predetermine time range from $T\_i$ in a time interval of size proportional to $StDev\_i$ ($T\_i-K*StDev\_i$, $T\_i+K*StDev\_i$). As the constant factor K is larger, there is less confidence in the anonymity.

In order to make sure there are k−1 other probes exiting at times in ($T\_i-K*StDev\_i$, $T\_i+K*StDev\_i$), for all i's, the mix zone may be enlarged. As the mix zone is enlarged, the $StDev\_i$'s are wider, due to adding more uncertainty to the travel times. Hence more probes have exit times that fall into the longer timer interval. The mix zone controller 121 may adjust the size of the mix zone 50 to maintain k-anonymity.

In one example, the mix zone includes a set of probable exit points $Y\_ij=\{y\_i1, y\_i2, y\_i3, \ldots y\_ij\}$. The probably exit points may be based on map data. For example, the probably exit points for the mix zone may be selected based on the road segments (e.g., the road network), turn restrictions applied to the road segments, and/or travel direction restrictions applied to the road segments. For each combination of entry point $x\_i$ and exit points $Y\_ij$: $\{\{x\_i, y\_i1\} \{x\_i, y\_i2\}, \ldots \{x\_i, y\_ij\}\}$, the mix zone controller 121 may calculate a set of time duration tuples, $D\_ij=\{\{d\_i1\_min, d\_i1\_max\}, \{d\_i2\_min, d\_i2\_max\}, \ldots \{d\_ij\_min, d\_ij\_max\}\}$ to exit $M\_i$ based on the map data. The time duration tuples may be calculated from speed restriction obtained from map data. The time duration tuples may be calculated from historical data such as historical trajectory data of travel paths through the geographic area corresponding to the mix zone. The mix zone controller 121 may calculate anonymity as $K\_ij=\{k\_i1, k\_i2, \ldots k\_ij\}$ for a set of number of other probes exiting from $Y\_i$ between times $\{\{t\_i+d\_i1\_min, t\_i+d\_i1\_max\}, \{t\_i+d\_i2\_min, t\_i+d\_i2\_max\}, \ldots \{t\_i+d\_ij\_min, t\_i+d\_ij\_max\}\}$. Here, $p\_i$ is $(1+\Sigma K\_i)$ anonymous. The mix zone controller 121 may calculate the anonymity and compare the anonymity to a threshold. If the anonymity is less than the acceptable threshold k, the mix zone controller 121 may increase the size of $M\_i$ and if the anonymity is greater than the acceptable threshold k, the mix zone controller 121 may decrease the size of $M\_i$.

The mix zone controller 121 may also calculate diversity. Let $L \subseteq Y\_ij$ be a set of exit points such that where $K\_ij>0$, and l be is the number be size of L. The mix zone controller 121 may also adjust the size and/or the shape of the mix zone 50 according to an L-diversity. The L-diversity ensures location of the probe is unidentifiable from a set of L different physical locations such as points of interest (e.g., churches, clinics, bars, etc.).

Figure 5A:
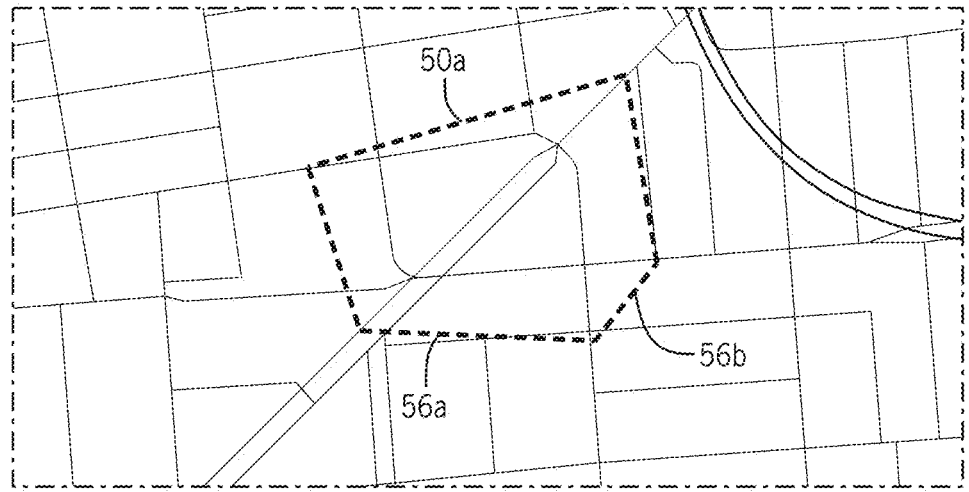
FIGS. 5A and 5B illustrate another example dynamic mix zone.
Figure 5B:
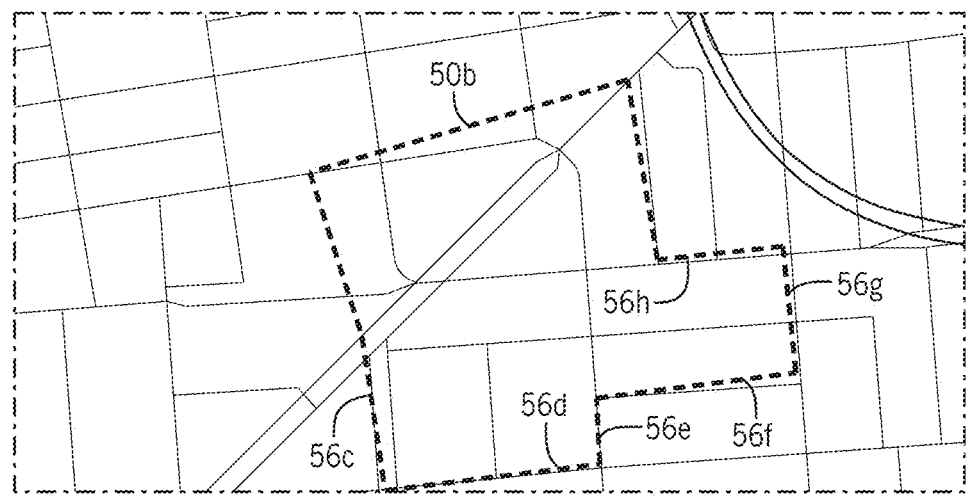

FIGS. 5A and 5B illustrate another example dynamic mix zone. In FIG. 5A mix zone 50a has a first size and shape. The mix zone controller 121 analyzes the anonymity provided by mix zone 50a based on one or combination of map data 31, traffic data 32, probe data 33, and mix zone table 34. In FIG. 5A the mix zone 50a is a first size (smaller size), which may be a default size. The mix zone controller 121 may enlarge the mix zone 50a by adding road segments that define the boundary. The mix zone controller 121 may modify mix zone 50a to generate mix zone 50b by removing road segments 56a and 56b and adding road segments 56c-56h. The mix zone table 34 may include set of mix zone boundaries for possible mix zones in various sizes.

The mix zones may be defined by a group of road segments. That is, rather than redefine a boundary for the mix zone in order to enlarge or shrink the mix zone, the mix zone controller 121 may add or remove road segments that define the mix zone. The mix zone table 34 may include a sequence of road segments. For example, a default mix zone may include road segments A and B. When the mix zone controller 121 increases the size, road segment C is added, and so forth. The sequence of the road segments may depend on the map data 31. For example, the curvature of the road segments may determine the order at which the road segments are added to the mix zone and/or how many road segments are added to the mix zone to enlarge the mix zone, the speed limits associated with the road segments may determine the order at which the road segments are added to the mix zone and/or how many road segments are added to the mix zone to enlarge the mix zone, or traffic restrictions (e.g., turn restriction or lane designations) may determine the order at which the road segments are added to the mix zone and/or how many road segments are added to the mix zone to enlarge the mix zone.

In another alternative or additional factor, the mix zone table 34 may be dynamic and depend on the current conditions. Example current condition are included in traffic data 32. The traffic data 32 may be received from an external source such as a traffic service. The traffic service compiles traffic data for probes 101a-n and optionally additional probes associated with other networks or devices. The traffic data 32 may describe the number of vehicles, or estimate thereof, of road segments. The traffic data 32 may describe the average speed of vehicles in one or more directions on specified road segments. The traffic data 32 may be classified in ranges such as high traffic, medium traffic, and low traffic and/or free flow speed, moderate speed, and slow speed. The number of road segments, or specifically which road segments, included in a mix zone according to the mix zone table 34 may depend on the traffic data 32. For example, a specific mix zone may include road segments A and B for slow speed, road segments A, B, and C for moderate speed, and road segments A, B, C, D, E, and F for free flow speed. As traffic increases fewer road segments are needed to make up a mix zone and ensure anonymity. More traffic means it is hard to couple a probe that enters the mix zone with a probe that exits the mix zone after the pseudonym has been applied.

Figure 6:
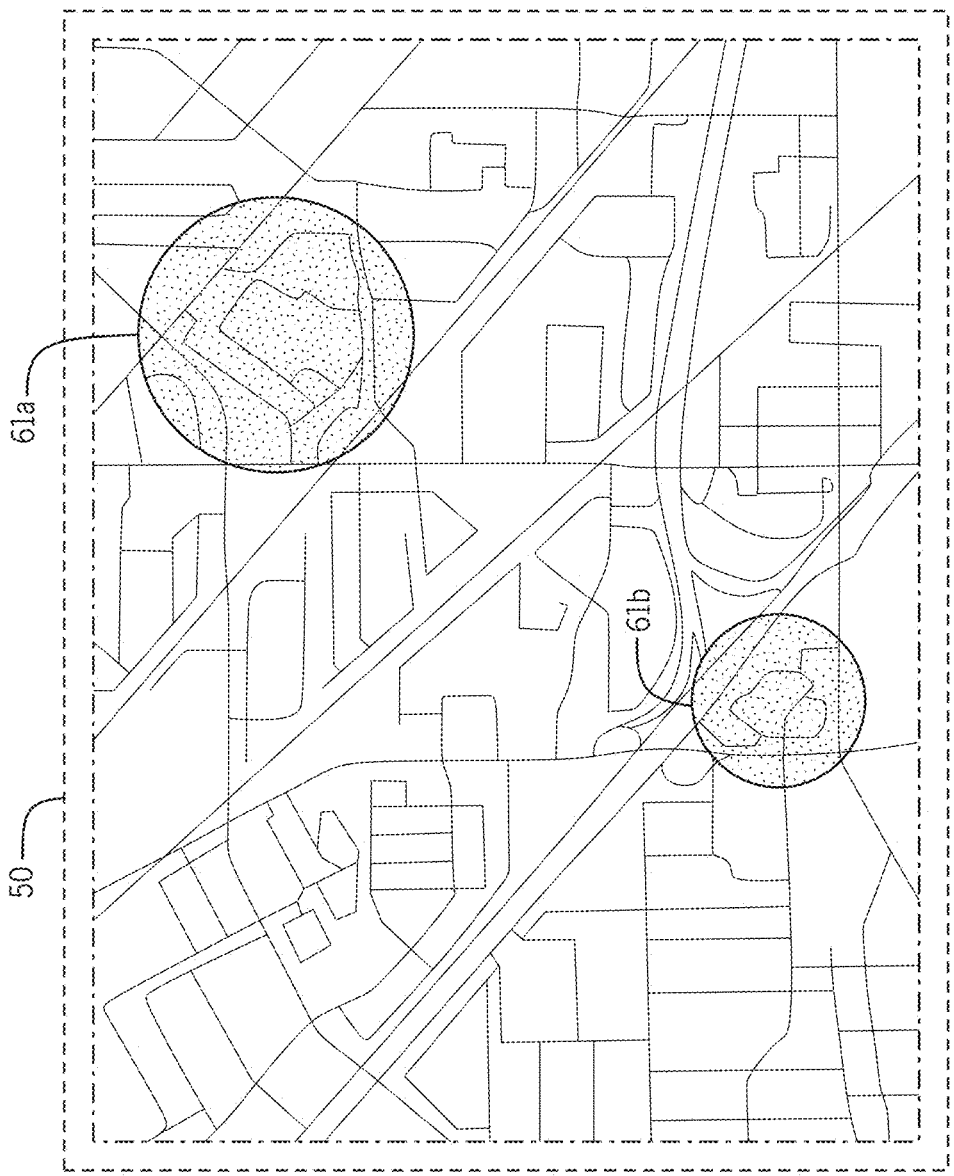
FIG. 6 illustrates a point of interest focused mix zone.

FIG. 6 illustrates a point of interest (POI) focused mix zone. Example points of interest may be frequently visited locations including shopping malls, restaurants, parking lots. The point of interest may be a non-uniform POI where users tend to spend an unpredictable amount of time. The time that probes spend at a POI may have an average duration and a standard deviation or variation. The non-uniform POI may be defined as having a standard deviation or variation within a predetermined range.

The mix zone controller 121 may adjust the shape and/or size of the mix zone 50 based on POIs or non-uniform POIs. The size or shape of the mix zone 50 may be sized to include a predetermined number of POIs or non-uniform POIs. The example in FIG. 6 includes mix zone 50 include two points of interest 61a and 61b. The predetermined may be any number such as one, two, three, etc. Alternatively, the size of the mix zone 50 may be selected to avoid POIs (e.g., include zero POIs).

When a mix zone includes a POI, the likelihood that probes stop and spend additional time in the mix zone is increased. This makes it easier for an unauthorized user who is aware of entry-exit transition probabilities and entry-exit times based on transitions, to merge trajectories that were split at mix-zones and map old and new pseudonyms. When mix zones are placed at social spots where probes spend non-uniform time, it is harder to merge trajectories and map pseudonyms.

Figure 7:
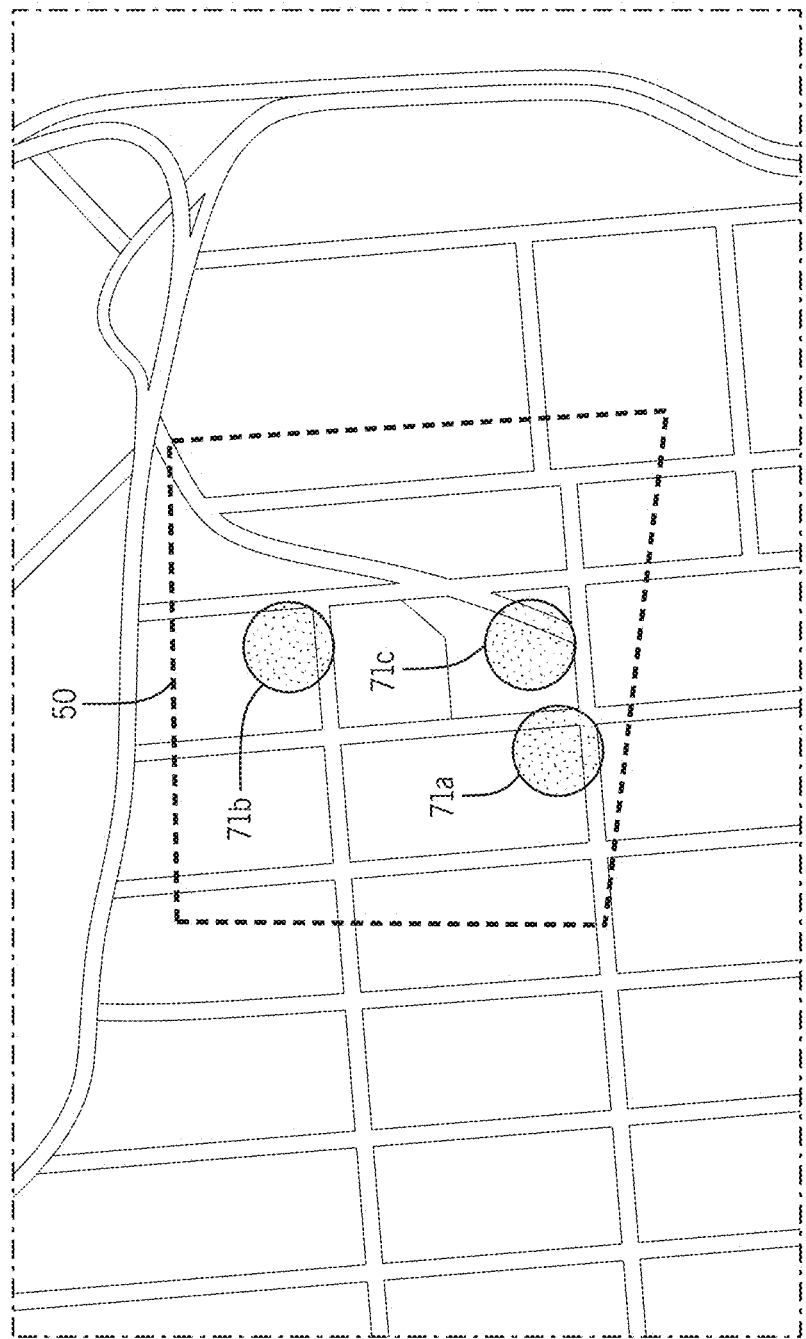
FIG. 7 illustrates another example dynamic mix zone.

FIG. 7 illustrates another example dynamic mix zone based on POIs. The mix zone controller 121 may adjust the shape and/or size of the mix zone 50 to have a certain number of POIs and/or a predetermined diversity among the POIs. The diversity of a POI may be based on a category of POI. Example categories of POI may include restaurants, parking lots/garages, stores, train stations, or others. In another alternative, the category of POI may be determined according to average duration or standard deviation of duration for historical visitors to the POI. The example of FIG. 7 includes three POIs 71a, 71b, and 71c, having different categories assigned. The categories are attributes of the POIs that may be stored along with the name of POI and location in geographic database 123.

The mix zone controller 121 may identify the categories for the POIs in the mix zone and determine whether the categories meet the predetermined diversity. If the diversity of the current POIs are less than the predetermined diversity, the mix zone controller 121 may increase the size of the mix zone in order to include more POIs of additional categories.

The diversity of the POIs may further mitigate the identity threat and prevent unauthorized user of the probe data from identifying a probe identity based on the POI. The diversity of the POIs may further mitigate the profiling threat by preventing an unauthorized user from profiling a probe based on POI category. For instance, if a mix-zone is placed around an area that has k restaurants serving l distinct types of cuisines, the unauthorized user or attacker's probability of correctly profiling a probe based on cuisine of liking would be 1/l. If instead of l distinct cuisines, all k restaurants are restaurants of a particular cuisine, the unauthorized user or attacker may profile probes passing through the mix-zone as people having a liking for the particular cuisine.

Figure 8:
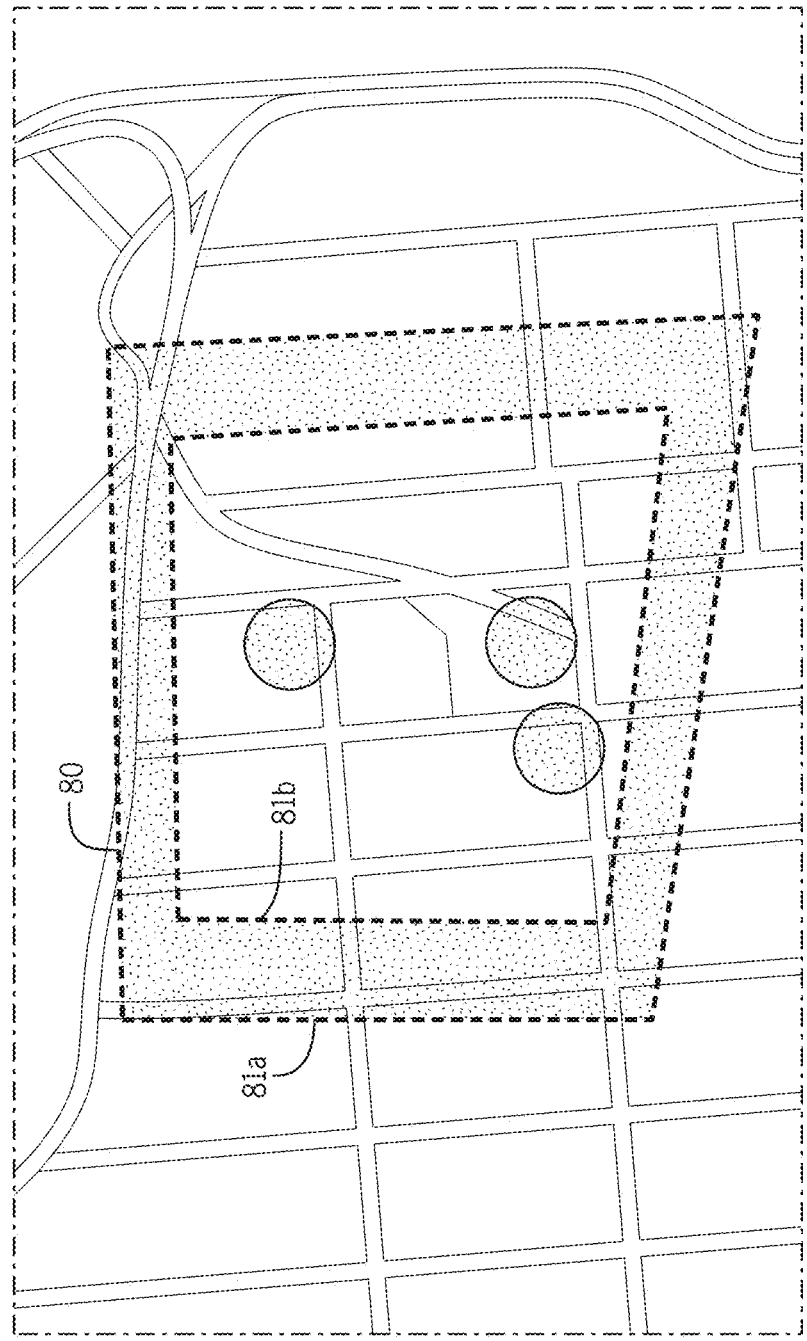
FIG. 8 illustrates an example perimeter based dynamic mix zone.

FIG. 8 illustrates an example perimeter based dynamic mix zone 80 including an outer perimeter 81a (outer mix zone boundary) and an inner perimeter 81b (inner mix zone boundary) making up the mix zone boundary such that the size of the dynamic mix zone 80 extends from the inner perimeter 81a to the outer perimeter. The dynamic mix zone 80 may have a ring shape, be a two-dimensional torus, or another shape defined by a first and second radius. The dynamic mix zone 80 may be a rectangular ring or formed from a first polygon within a second polygon. The types of polygons may be the same or mixed of different shapes (e.g., the inner perimeter 81b may be a square and the outer perimeter 81b may be a quadrilateral). Other shapes are possible.

The mix zone controller 121 may adjust the shape and/or size of the mix zone 80 by moving the outer perimeter 81a and/or the inner perimeter 81b according to any of the embodiments herein. The mix zone controller 121 may initially define the outer perimeter 81a and/or the inner perimeter 81b according to a parameter of the geographic area. The parameter may be map data, anonymity, or traffic levels.

The mix zone generator 37 is configured to define the inner boundary 81b and the outer boundary 81a such that the size of the mix zone extends from the inner boundary 81b to the outer boundary 81a. The inner boundary 81b and the outer boundary 81a may be set according to the one or more map features, the number of probes traveling through the mix zone, or the locations of POIs in the vicinity. In addition or alternatively, the location of inner boundary 81b and the outer boundary 81a may be selected according to an anonymity level according to any of the examples herein.

The mix zone controller 121 is configured to receive real time data such as probe data for one or more probes in the geographic area of the mix zone. In some examples, the outer perimeter 81a and/or the inner perimeter 81b are adjusted so that the mix zone 80 includes a predetermined number of probes. In some examples, the outer perimeter 81a and/or the inner perimeter 81b are adjusted so that the mix zone 80 includes a predetermined number of road segments or nodes. In some examples, the outer perimeter 81a and/or the inner perimeter 81b are adjusted so that the mix zone 80 includes a predetermined number of POIs. The mix zone controller 121 may adjust the shape and/or size of the mix zone 80 by moving the outer perimeter 81a and/or the inner perimeter 81b according to the threshold level of anonymity (e.g., the required k-level anonymity).

When increasing the size of the mix zone 80, the mix zone controller 121 may move the outer perimeter 81a and/or the inner perimeter 81b farther apart. When decreasing the size of the mix zone 80, the mix zone controller 121 may move the outer perimeter 81a and/or the inner perimeter 81b closer together. The mix zone controller 121 may also change the shape of the mix zone 80 to track the road segments or to be a predetermined shape (e.g., circle, oval, polygon).

The mix zone controller 121 is configured to monitor one or more probes traveling between the outer perimeter 81a and the inner perimeter 81b or otherwise within a predetermined distance to the variable mix zone. The mix zone controller 121 selects a pseudonym for the at least one probe in response to the location of the one or more probes and applies the pseudonym for the at least one probe in the geographic data when the at least one probe crosses the outer perimeter 81*a* and/or the inner perimeter 81*b*.

The mix zone controller 121 may monitor the anonymity level of the variable mix zone. The anonymity level may be calculated based on the size of the area between of the outer perimeter 81*a* and the inner perimeter 81*b*, the distance between the outer perimeter 81*a* and/or the inner perimeter 81*b*, traffic levels, or the number of probes between the outer perimeter 81*a* and/or the inner perimeter 81*b*. The mix zone controller 121 may compare the anonymity level to a threshold and adjust the inner mix zone boundary or the outer mix zone boundary in response to the comparison.

When the mix zone 80 is a perimeter-based polygon, the access to location-based services may be improved while maintaining anonymity. As described herein, the server 125 or the external device 41 may disable location-based services when the probe 101 is traveling in the mix zone 80. With the perimeter-based polygon, access to location-based services may be enabled inside of the inner perimeter 81*b*. At the same time, a wide coverage area for the mix zone is achieved to maintain the anonymity of the probes 101.

The pseudonyms may be applied to the probe data based on the inner boundary 81*b* and the outer boundary 81*a*. A path following a single direction of travel (or more than one direction of travel) across the mix zone 80 twice. The pseudonyms may be applied in more than one instance. A path may cross the outer boundary 81*a*. Location based services may be disabled while traveling through the mix zone. A pseudonym is applied when the probe cross inner boundary 81*b* and the probe is inside of the inner boundary 81*a*. Inside the inner boundary 81*a*, location-based services may be enabled. When the probe crosses the inner boundary 81*b* for a second time, location-based services are disabled again. When the probe crosses the outer boundary 81*a* a second time, a second pseudonym is applied.

Figure 9A:
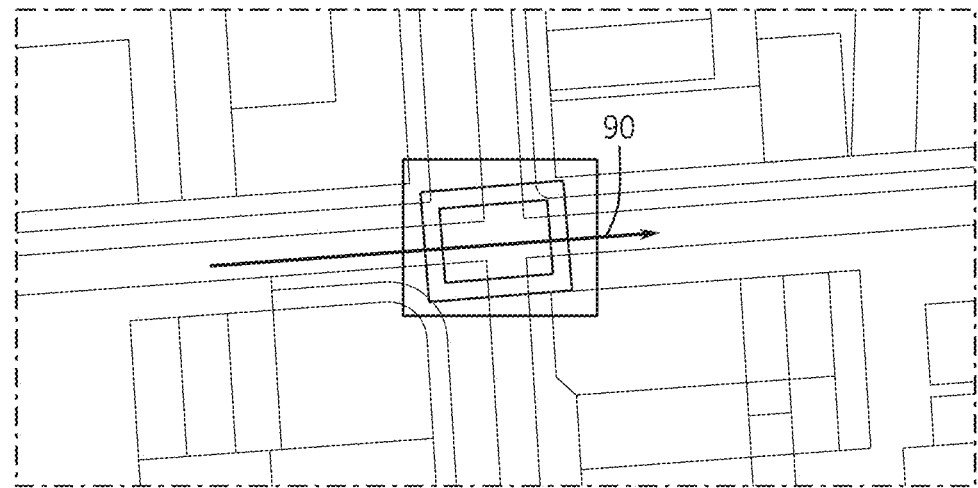
FIGS. 9A and 9B illustrate artificial trajectories for a mix zone.
Figure 9B:
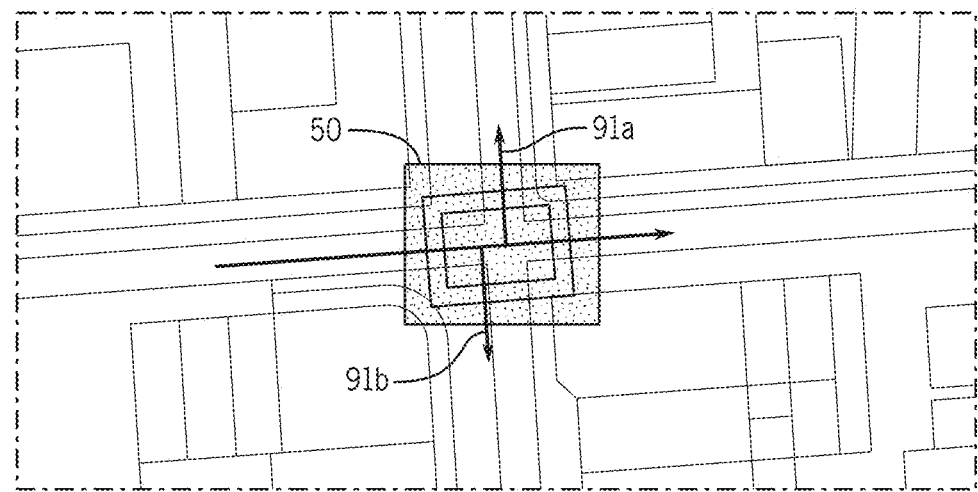

FIGS. 9A and 9B illustrate artificial trajectories for a mix zone. The artificial trajectories, or dummy trajectories, may be generated by the mix zone controller 121. The artificial trajectory is a set of data included in the probe data that does not originate with measurements takes at a mobile device 122 or vehicle 124. The artificial trajectory is generated to increase the anonymity of the data. The mix zone controller 121 may insert or fuse one or more artificial trajectories with the mix zone.

When the probe data is sparse, an unauthorized user may more easily map pseudonyms of probes who change identities at a mix-zone. Consider a simple scenario in FIG. 9A where the probe data includes only trajectory 90 through the mix zone 50, and the probe assumes a new identity. Since there was no other trajectory passing the zone at the same time, the anonymity set size is 1 (including itself). In this scenario an unauthorized user can easily map old and new probe pseudonyms.

FIG. 9B illustrate two artificial trajectories 91*a* and 91*b* included in the mix zone 50. By increasing the number of probes that exit the mix zone 50, the anonymity is increased. The inclusion of artificial trajectories may be used in combination with any of the techniques described herein for change the shape of the mix zone 50.

In some examples, the mix zone controller 121 may compare the anonymity of the mix zone to a threshold and calculate an amount to increase the shape of the mix zone as a function of the number of artificial trajectories that are included. More artificial trajectories mean less increase in size needed for the mix zone. In some examples, the mix zone controller 121 may compare the anonymity of the mix zone to a threshold and calculate a number of artificial trajectories to include in the mix zone as a function of the size increase applied to the mix zone. A greater size increase means fewer artificial trajectories are included. Thus, using artificial trajectories the specified anonymity level may be achieved using a smaller mix zone.

The mix zone controller 121 may analyze the map data 31 and determine the trajectories passing through a mix zone and compute mix zone entry-exit node transition probabilities. The mix zone controller 121 may compute transition time clusters set T for the trajectories passing through the mix zone. For each probe entering a mix-zone, the mix zone controller 121 computes anonymity. If the anonymity (a) is less than the anonymity threshold (k), the mix zone controller 121 generates probable trajectories in the quantity of (k–a) based on the time clusters set T.

Figure 10:
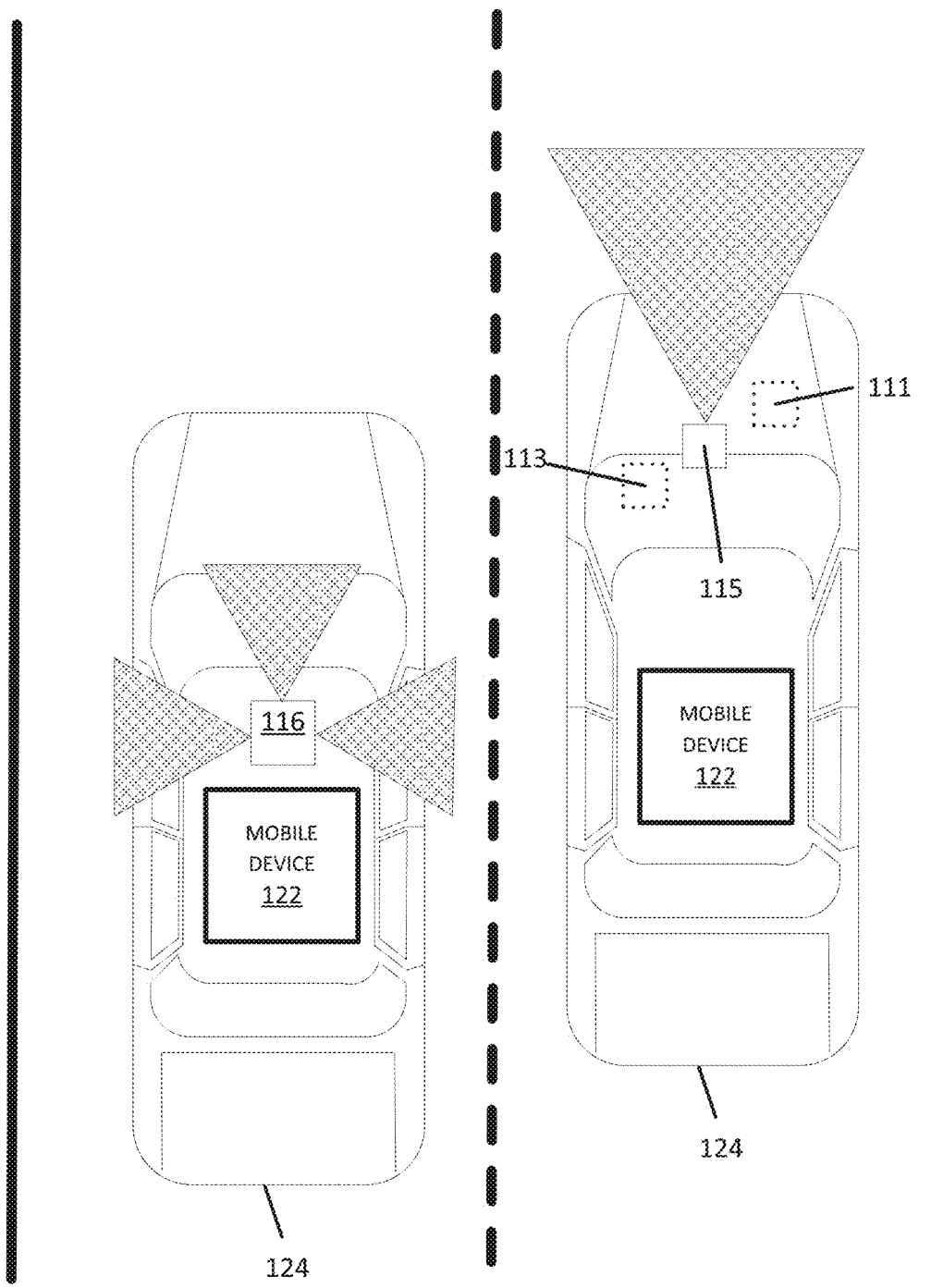
FIG. 10 illustrates an exemplary vehicle of the systems of FIGS. 1-9.

FIG. 10 illustrates an exemplary vehicle 124 of the systems of FIGS. 1-9. The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124.

The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to geographic data received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to geographic data received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to geographic data received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on to geographic data received from geographic database 123 and the server 125 and driving commands or navigation commands.

Figure 11:
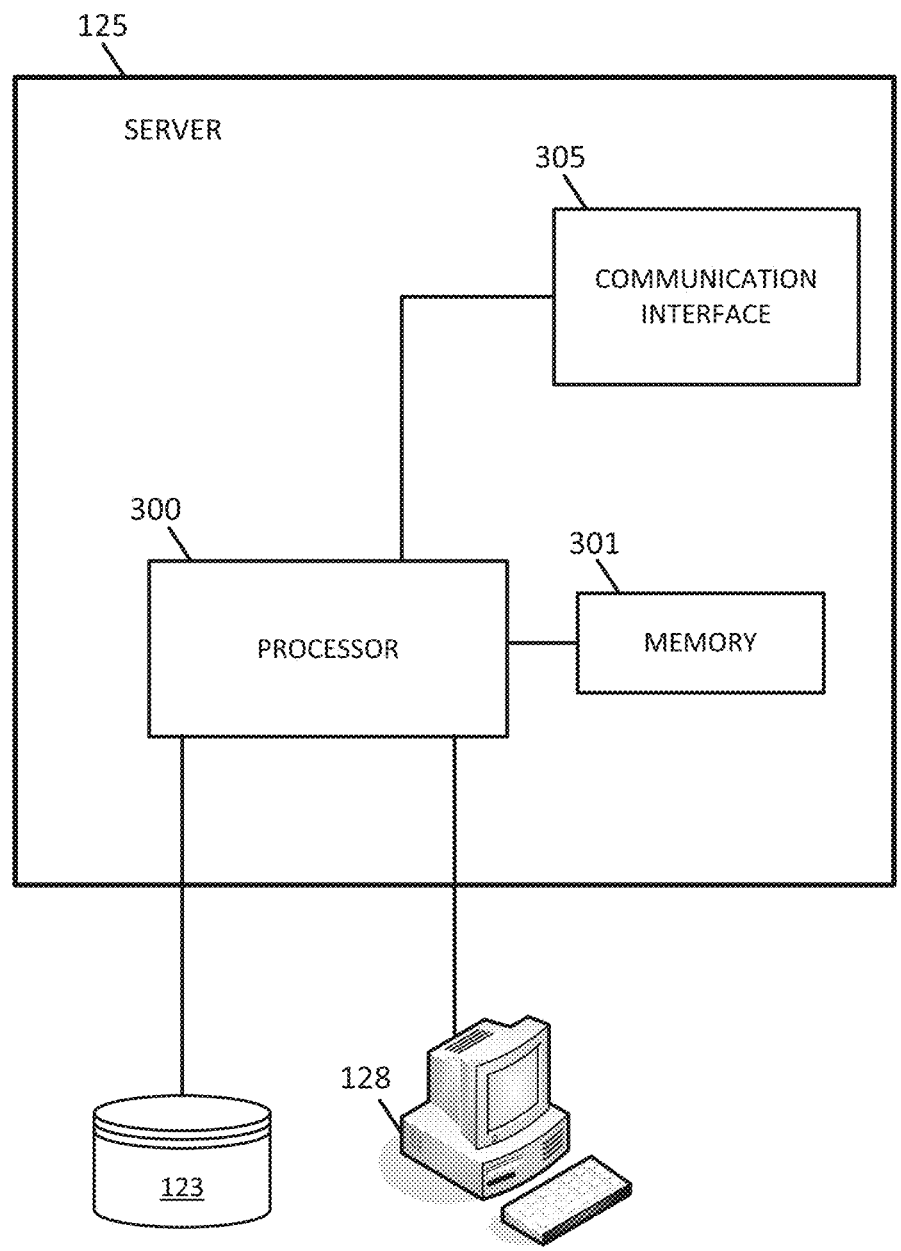
FIG. 11 illustrates an example server.

FIG. 11 illustrates an example server 125, which may apply to the system of FIG. 1. The server 125 includes a processor 300, a communication interface 305, a memory 301, and a database 123. The processor 300 may implement the functions associated with the mix zone generator 37, the pseudonym generator 38, and anonymity calculator 39. The memory 301 may store the map data 31, the traffic data 32, the probe data 33, and the mix zone table 34. The communication interface 305 may facilitate the receipt of the probe data 33 from the probes 101*a-n* as well as provide the protected probe data 33 to the external device 41. An input device (e.g., keyboard or personal computer 128) may be used to enter settings to the server 125. The settings may include settings for the mix zone. The settings for the mix zone may include the default boundaries for the mix zone. The settings for the mix zone may include the framework for defining the mix zone such as road segments, nodes, or geographic coordinates. The settings for the mix zone anonymity settings or thresholds. Additional, different, or fewer components may be provided in the server 125.

Figure 12:
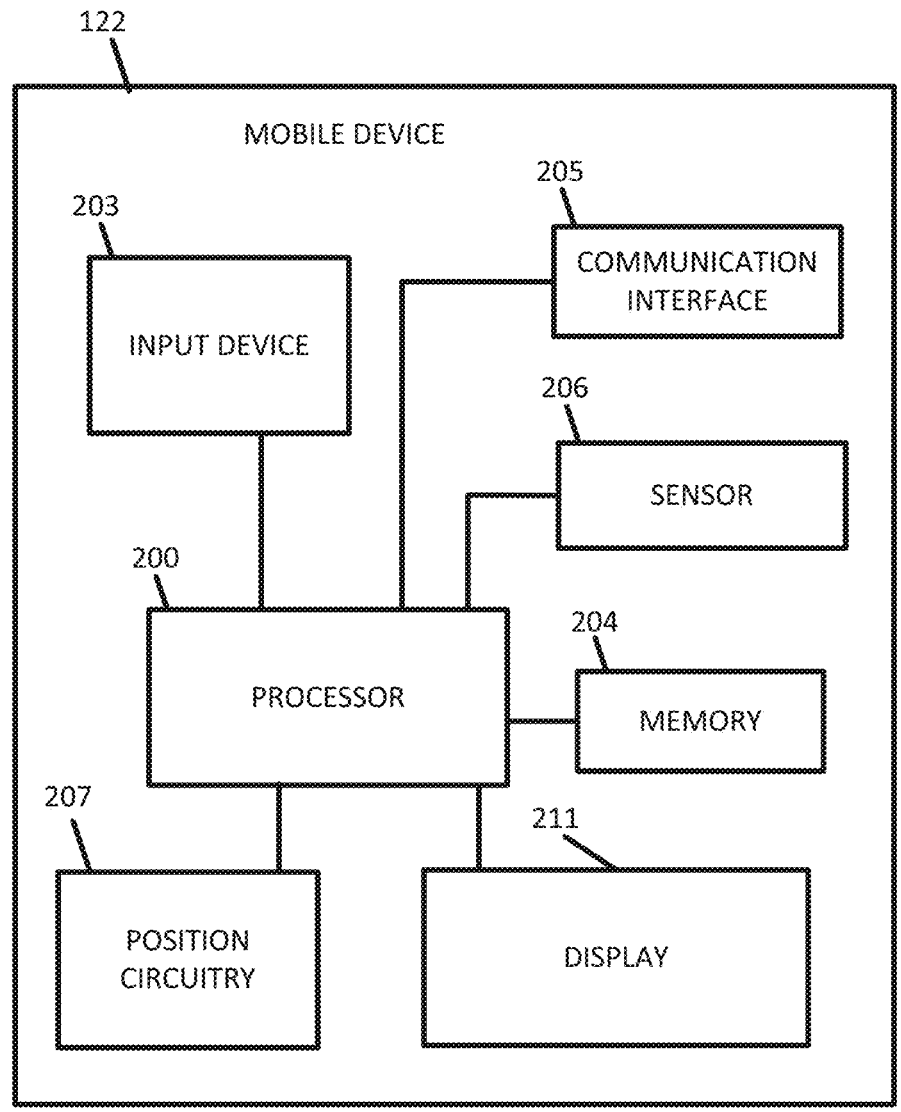
FIG. 12 illustrates an example mobile device.

FIG. 12 illustrates an exemplary mobile device 122 of the system of FIG. 1. The mobile device 122 includes a processor 200, a memory 204, an input device 203, a communication interface 205, position circuitry 207, a display 211, and a sensor 206. The input device 203 may receive commands from the user for default settings for the mix zones. The default settings may include the default boundaries for the mix zone. The settings for the mix zone may include the framework for defining the mix zone such as road segments, nodes, or geographic coordinates. The settings for the mix zone anonymity settings or thresholds.

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

Figure 13:
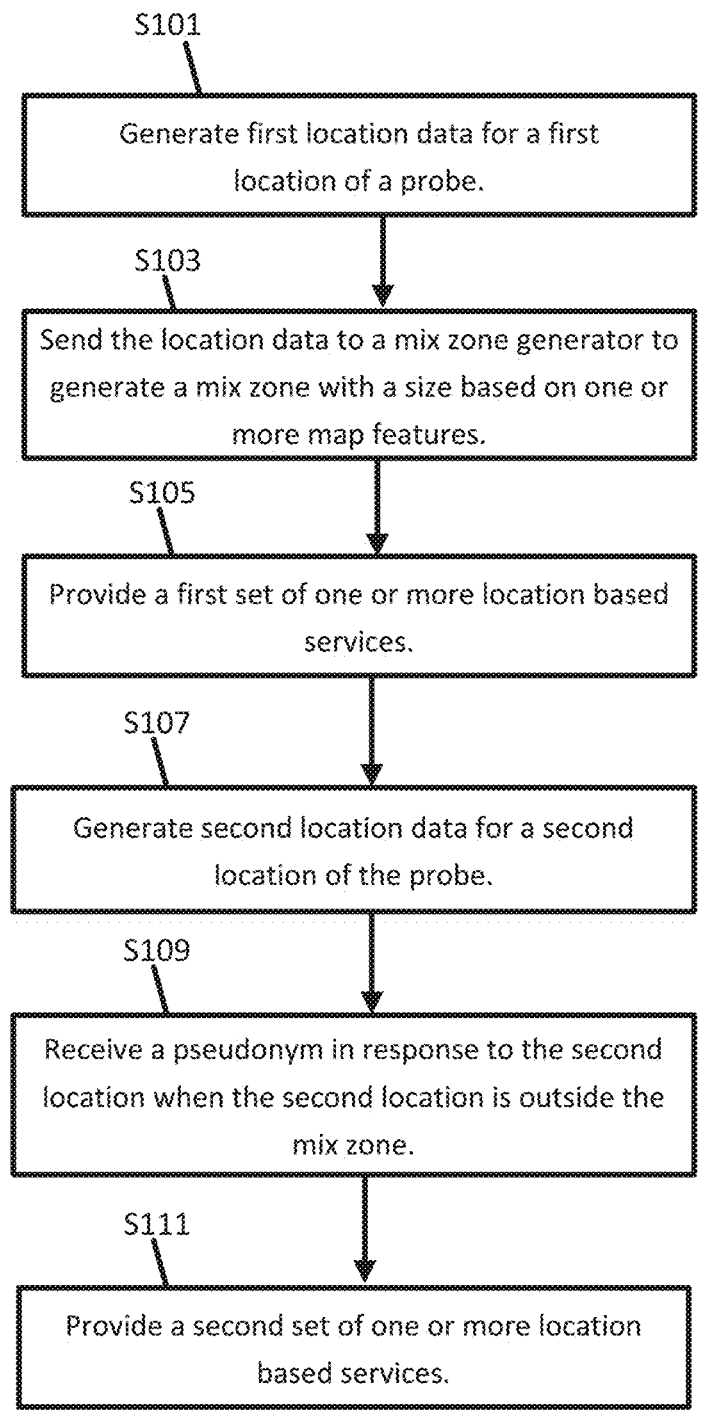
FIG. 13 illustrates an example flowchart for the mobile device of FIG. 12.

FIG. 13 illustrates an example flowchart for the operation of mobile device 122. Additional, different, or fewer acts may be provided.

At act S101, the processor 200 generates, using position circuitry 207, location data for the mobile device 122. One or more map features are identified in response to the location data. The map features may be within a predetermined distance from the location in the location data. The map features may include turn restrictions, speed limits, or other attributes of one or more road segments or nodes.

The position circuitry 207 or the processor 200 detects a geographic position of the mobile device 122 or the vehicle 124. The position circuitry 207 is one example means for detecting or determining a geographic position. The processor 200 may also include circuity serving as means for detecting or determining a geographic position. The detected geographic position of the mobile device 122 may include a latitude and longitude pair. The geographic position may be detected or sampled at periodic intervals in time or distance or may be continuously detected. The sensor 206, which may include distancing sensors, range sensor, image sensors, or another sensor as described with respect to FIG. 10 may also provide information for determining the geographic position of the mobile device 122.

At act S103, the processor 200 or the communication interface 205 sends the location data to a mix zone generator, or sever, to generate a mix zone with a size based on one or more map features. The mix zone may be defined according to any of the examples herein. The communication interface 205 is one example means for sending the location data to the mix zone generator. The processor 200 may also include circuity serving as means for sending the location data to the mix zone generator.

At act S105, the processor 200 provides a first set of one or more location-based services in response to the mobile device being at the first location. The location-based services may be limited because the mobile device 122 is traveling in the mix zone. The disabled location-based services may be those services provided by a particular server. The disable location-based services may be all location-based services. In one example, the server 125 is a means for disabling location-based services.

At act S107, the processor 200 generates, using position circuitry 207, second location data for the mobile device 122. The position circuitry 207 or the processor 200 detects a geographic position of the mobile device 122 or the vehicle 124. The position circuitry 207 is one example means for detecting or determining a geographic position. The processor 200 may also include circuity serving as means for detecting or determining a geographic position. The detected geographic position of the mobile device 122 may include a latitude and longitude pair.

At act S109, the processor 200, or the communication interface 205, applies a pseudonym in response to the second location data being outside of the mix zone. The pseudonym generator 38 is an example means for generating a pseudonym. At act S111, the processor 200 provides a second set of location-based services. The location-based services may be enabled after the pseudonym is applied. The location-based services may be enabled in response to the second location. The set of location-based services may be all services associated with the server 125.

The processor 200 may include a routing module including an application specific module or processor that calculates routing between an origin and destination. The routing module is an example means for generating a route through the mix zone to the destination, which may be the second location outside of the mix zone. The routing command may be a driving instruction (e.g., turn left, go straight), which may be presented to a driver or passenger, or sent to an assisted driving system. The display 211 is an example means for displaying the routing command. The mobile device 122 may generate a routing instruction based on the mix zone.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Figure 14:
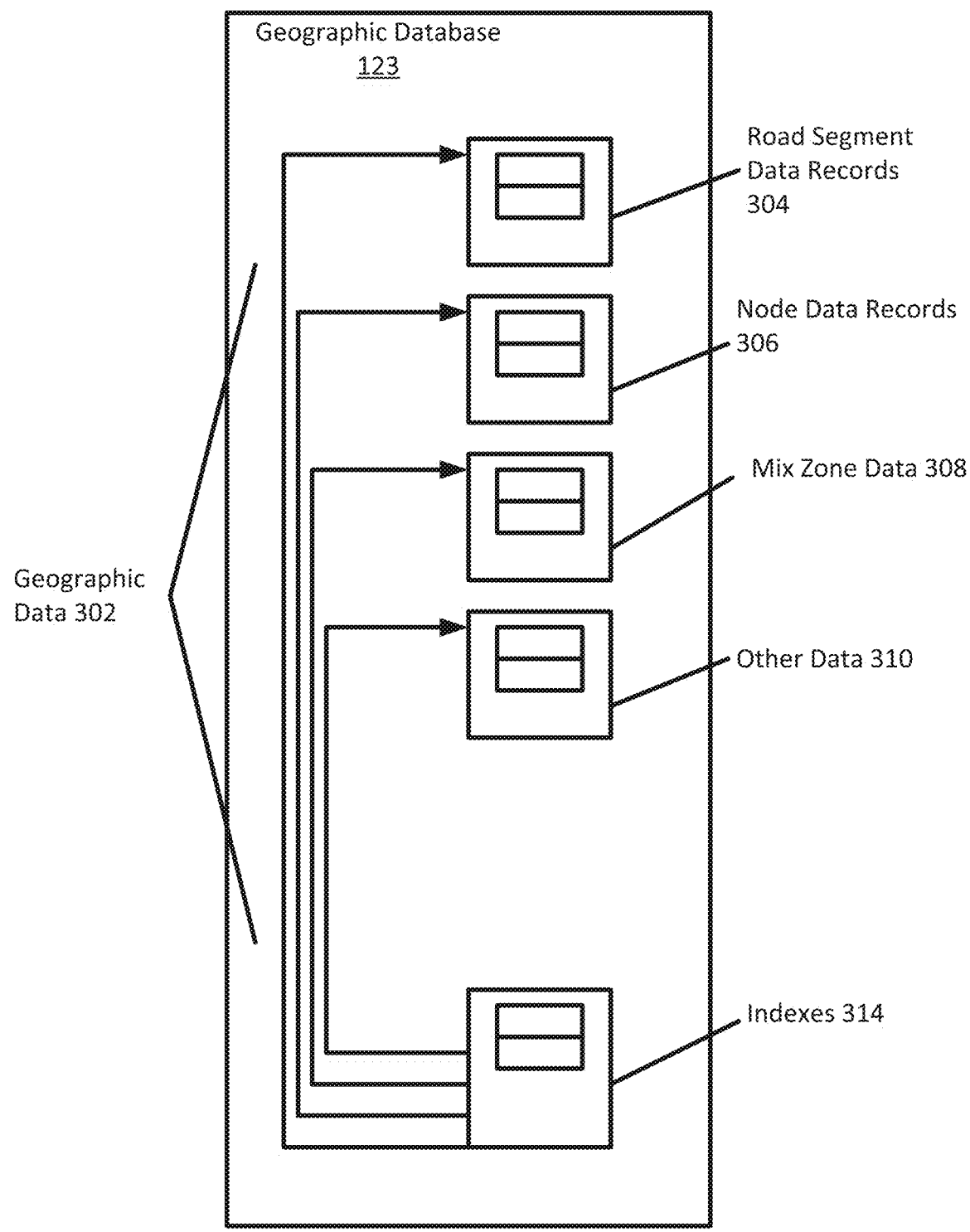
FIGS. 14 and 15 illustrate example geographic databases.

In FIG. 14, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate mix zone data 308 with a road segment in the segment data records 304 or a geographic coordinate. An index 314 may, for example, store mix zone data 308 relating to one or more locations for boundaries of one or more mix zones. The mix zone data 308 may include the mix zone table 34. The mix zone data 308 may include a list of road segments, nodes, or geographic coordinates for the mix zone.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 15:
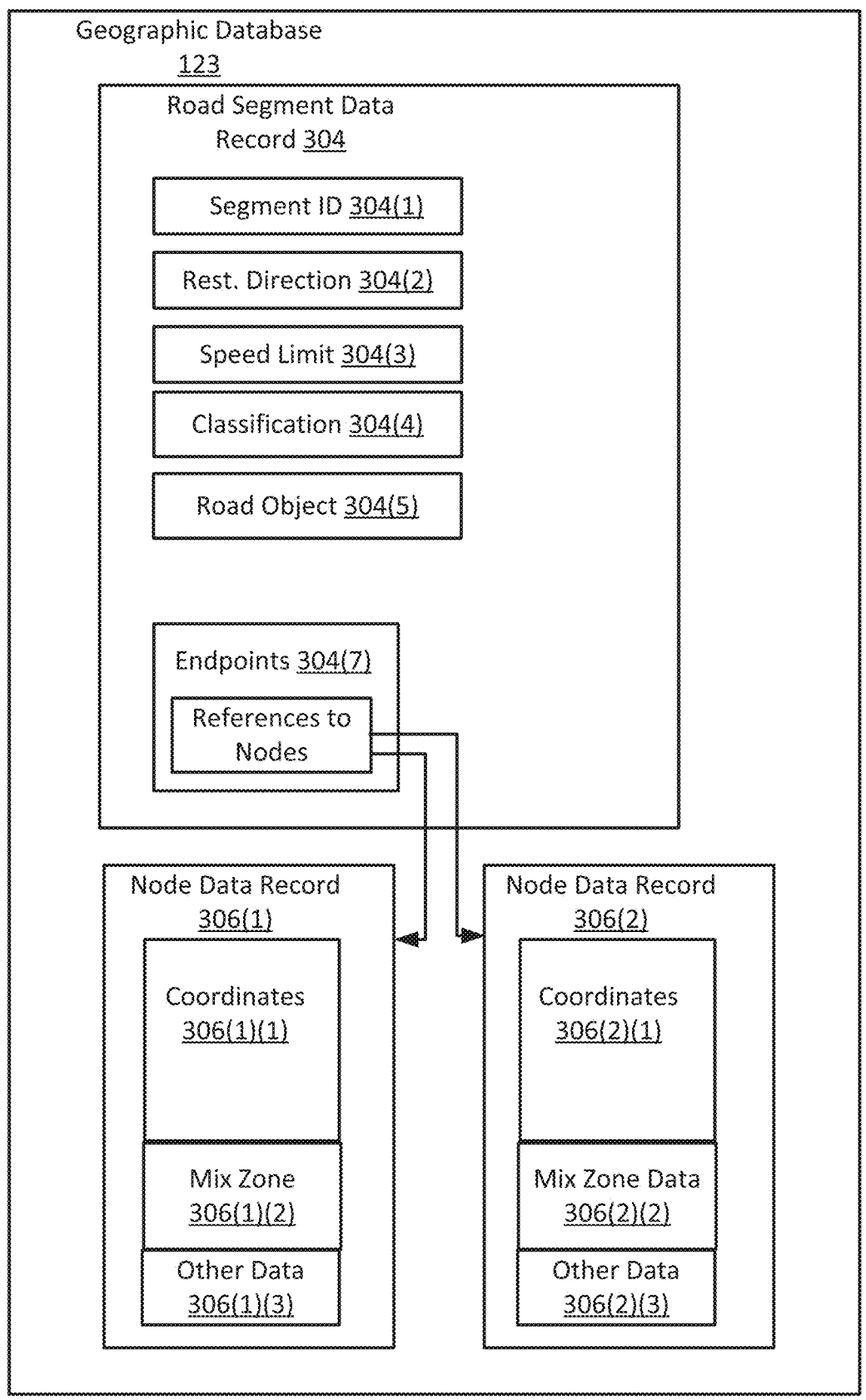

FIG. 15 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 15 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and mix zone data 306(1)(2) and 306(2)(2), which may include boundaries of the mix zone or road segments or nodes defining the mix zones. The mix zone data 306 (1)(2) and 306(2)(2) may change dynamically or over time. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for providing anonymity in geographic data for probes using a variable mix zone in a geographic region, the method comprising:
 identifying one or more map features in the geographic region;
 defining, using a processor, a mix zone boundary having a size based on the one or more map features;
 receiving probe data for at least one probe, the probe data including a location within a predetermined distance of the mix zone boundary;
 selecting, using the processor, a pseudonym for the at least one probe in response to the location of the probe data; and
 applying the pseudonym for the at least one probe in the geographic data when the at least one probe exits the mix zone.

Embodiment 2

The method of embodiment 1, wherein the one or more map features includes a turn restriction, a speed limit, a geometric feature of a road segment, or a restriction for traveling the road segment.

Embodiment 3

The method of any of embodiments 1 and 2, further comprising:
 assigning a first identifier to the at least one probe prior to entering the mix zone, wherein the pseudonym is a second identifier assigned after the at least one probe exits the mix zone.

Embodiment 4

The method of any of embodiments 1 to 3, wherein the size of the mix zone boundary is based on an anonymity level.

Embodiment 5

The method of any of embodiments 1 to 4, further comprising:
 comparing the anonymity level to a threshold; and
 adjusting the mix zone boundary for the size of the mix zone.

Embodiment 6

The method of any of embodiments 1 to 5, wherein when the anonymity level is less than the threshold, the size of the mix zone is increased.

Embodiment 7

The method of any of embodiments 1 to 6, wherein the anonymity level is a k-anonymity for a probe such that a probability of identifying the probe from k probes in the mix zone is 1/k.

Embodiment 8

The method of any of embodiments 1 to 7, wherein the at least one probe is indistinguishable in the probe data from other probes in the mix zone.

Embodiment 9

The method of any of embodiments 1 to 8, further comprising:
disabling at least one location-based service for at least one device associated with the at least one probe in response to the at least one probe crossing the mix zone boundary.

Embodiment 10

The method of any of embodiments 1 to 9, wherein the mix zone boundary intersects one or more nodes between road segments.

Embodiment 11

The method of any of embodiments 1 to 10, wherein the mix zone boundary includes an inner boundary and an outer boundary and the size of the mix zone extends from the inner boundary to the outer boundary.

Embodiment 12

The method of any of embodiments 1 to 11, further comprising:
disabling at least one location-based service for at least one device associated with the at least one probe in response to the at least one probe crossing either the outer boundary or the inner boundary,
wherein the pseudonym is applied for the at least one probe when the at least one probe crosses either the outer boundary or the inner boundary.

Embodiment 13

An apparatus, configured to perform and/or control the method of any of embodiments 1-12 or comprising means for performing and/or controlling any of embodiments 1-12.

Embodiment 14

An apparatus, comprising at least one processor and at least one memory including computer program code for one or more programs, the at least one memory and the computer program code configured to, with the at least one processor, to perform and/or control the method of any of embodiments 1-12.

Embodiment 15

A computer program comprising instructions operable to cause a processor to perform and/or control the method of any of embodiments 1-12, when the computer program is executed on the processor.

Embodiment 16

A method including generating first location data for a first location of a probe, wherein one or more map features are identified in response to the first location data; sending the location data to a mix zone generator for defining a mix zone having a size based on the one or more map features, wherein the first location is within the mix zone; generating second location data for a second location of the probe; and receiving a pseudonym in response to the second location of the probe being outside the mix zone.

We claim:

1. An apparatus for providing anonymity in geographic data for probes using a variable mix zone in a geographic region, the apparatus comprising:
a geographic database configured to store one or more attributes of a road or intersection in the geographic region;
a mix zone generator configured to define a mix zone boundary having a size based on the one or more attributes of a road or intersection and monitor probe data for at least one probe, wherein identities of devices are protected for probe data including a location within the mix zone boundary; and
an anonymity calculator configured to calculate an anonymity level, wherein the size of the mix zone boundary is based on the anonymity level, wherein the anonymity calculator is configured to compare the anonymity level to at least one threshold and adjust the mix zone boundary for the size of the mix zone.

2. The apparatus of claim 1, further comprising:
a pseudonym generator configured to select a pseudonym for the at least one probe in response to the location of the probe data and apply the pseudonym for the at least one probe in the geographic data when the at least one probe exits the mix zone.

3. The apparatus of claim 1, wherein the one or more attributes of a road or intersection includes a turn restriction or a speed limit.

4. The apparatus of claim 1, wherein the at least one threshold includes a minimum threshold and a maximum threshold, when the anonymity level is less than the minimum threshold, the size of the mix zone is increased, and when the anonymity level is greater than the maximum threshold, the size of the mix zone is decreased.

5. The apparatus of claim 1, wherein the mix zone boundary includes an inner boundary and an outer boundary and the size of the size of the mix zone extends from the inner boundary to the outer boundary.

6. A method for providing anonymity in geographic data for at least one probe using a variable mix zone in a geographic region, the method comprising:
defining, using a processor, a mix zone boundary;
calculating an anonymity level;
performing a comparison of the anonymity level to at least one threshold; and
determining a size for the mix zone boundary based on the comparison of the anonymity level to the at least one threshold, wherein one or more identities of the at least one probe are protected for probe data including a location within the mix zone boundary.

7. The method of claim 6, further comprising:
selecting a pseudonym for the at least one probe in response to the location of the probe data; and
applying the pseudonym for the at least one probe in the geographic data when the at least one probe exits the mix zone.

8. The method of claim 7, further comprising:
assigning a first identifier to the at least one probe prior to entering the mix zone, wherein the pseudonym is a second identifier assigned after the at least one probe exits the mix zone.

9. The method of claim 6, wherein the at least one probe is indistinguishable in the probe data from other probes in the variable mix zone.

10. The method of claim 6, wherein the mix zone boundary intersects one or more nodes between road segments.

11. The method of claim 6, wherein the mix zone boundary includes an inner boundary and an outer boundary and the size of the mix zone extends from the inner boundary to the outer boundary.

12. The method of claim 11, further comprising:

disabling at least one location-based service for at least one device associated with the at least one probe in response to the at least one probe crossing either the outer boundary or the inner boundary, wherein a pseudonym is applied for the at least one probe when the at least one probe crosses either the outer boundary or the inner boundary.

13. A non-transitory computer readable medium including instructions that when executed by a processor performs a method for providing anonymity in geographic data for at least one probe using a variable mix zone in a geographic region, the method comprising:

defining, using a processor, a mix zone boundary;

calculating an anonymity level;

performing a comparison of the anonymity level to at least one threshold; and determining a size for the mix zone boundary based on the comparison of the anonymity level to the at least one threshold, wherein one or more identities of the at least one probe are protected for probe data including a location within the mix zone boundary.

14. The non-transitory computer readable medium of claim 13, wherein at least one location-based service is disabled in response to a location of the at least one probe.

* * * * *